Dec. 21, 1971  H. SCHMITZ ET AL  3,629,407
DOMESTIC ACID AND METHOD OF PRODUCING SAME
Filed Oct. 15, 1965  2 Sheets-Sheet 1
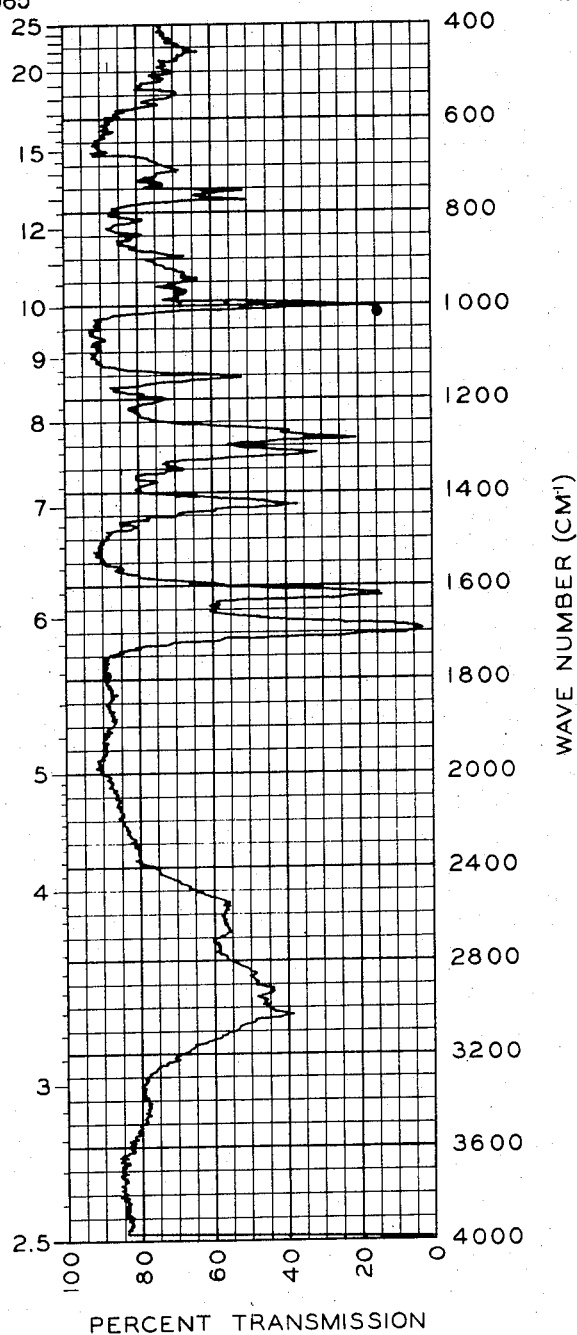
FIG. I
HENRY SCHMITZ
ROBERT L. DE VAULT INVENTORS.
BY CURTIS W. CARLSON
RICHARD H. BRINK
ROBERT B. SIMONTON AND
HERBERT W. TAYLOR, JR.
ATTORNEYS

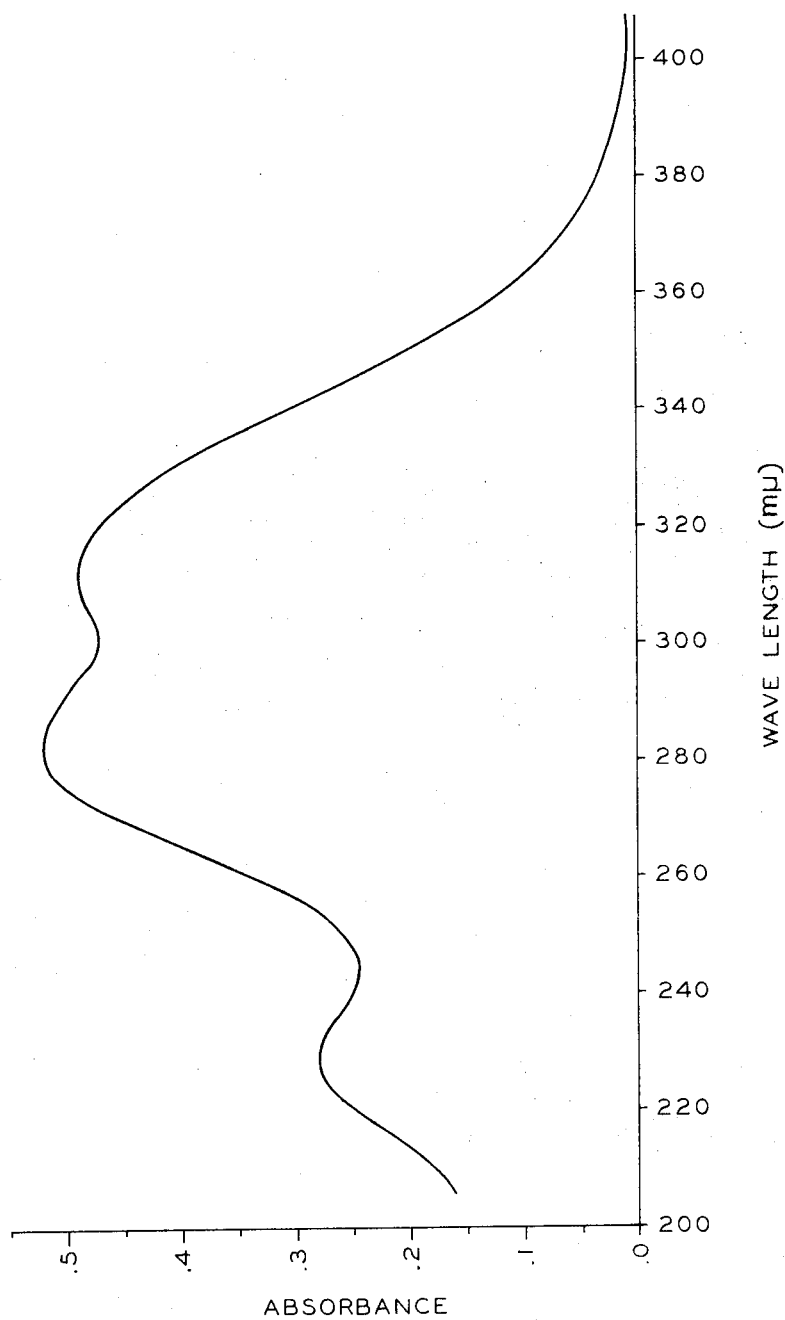

United States Patent Office 3,629,407
Patented Dec. 21, 1971

3,629,407
DEMETIC ACID AND METHOD OF PRODUCING SAME
Henry Schmitz, Syracuse, and Robert L. DeVault, North Syracuse, N.Y., assignors to Bristol-Myers Company, New York, N.Y.
Filed Oct. 15, 1965, Ser. No. 496,501
Int. Cl. A61k 21/00
U.S. Cl. 424—122                                    6 Claims

ABSTRACT OF THE DISCLOSURE

Demetic acid is a new antibiotic and is produced by the cultivation of *Streptomyces umbrosus* var. *suragaoensis*. Demetic acid inhibits in vitro the growth of certain microorganisms, including bacteria, yeasts, fungi and protozoa.

---

This invention relates to a new and useful substance herein designated demetic acid, and to processes for its production. More particularly, this invention relates to processes for its production by fermentation and methods for its recovery and purification. The invention embraces this antibiotic in dilute solutions, as crude concentrates and as purified solids. Demetic acid is markedly toxic to many types of neoplastic tissue cells in vitro and has an inhibitory action in vitro against the growth of certain microorganisms, including bacteria, yeasts, fungi and protozoa. Thus, demetic acid is useful in separating and classifying mixtures of microorganisms for biological research, and for the removal of microorganisms from laboratory equipment and medical and dental instruments.

There is provided according to the present invention, the process for the production of an antibiotic, designated demetic acid, also known as antibiotic NSC B152222, which comprises cultivating a demetric acid-producing variety of *Streptomyces umbrosus* designated *Streptomyces umbrosus* var. *suragaoensis*, e.g., A.T.C.C. No. 19104, in an aqueous carbohydrate solution containing a nitrogenous nutrient under submerged aerobic conditions until substantial activity against HeLa cell is imparted to said solution, and, then if desired, recovering said demetic acid from said solution. There is further included within the scope of the present invention, the demetic acid so produced.

The microorganism producing the antibiotic demetric acid of the present invention was isolated from a sample of soil collected in the Province of Suragao, Republic of the Philippines, and is a new variety of the species *Streptomyces umbrosus*, and has been designated *Streptomyces umbrosus* var. *suragaoensis*. A culture of the living organism, given the laboratory designation C-14,153, has been deposited in the American Type Culture Collection, Rockville, Md., and added to its permanent collection of microorganisms as A.T.C.C. 19104.

This invention also includes the pharmaceutically acceptable nontoxic salts of demetic acid, for example, the nontoxic metallic salts such as sodium, potassium, calcium, aluminum and the like.

*Steptomyces umbrosus* var. *suragaoensis* is melanin positive, forms gray sporulating aerial mycelium and smooth-walled spores arranged in open loops and spirals. The culture is further characterized by the production of demetic acid as well as a complex of agents related to the antimycins and phyllomycins.

Petri dish cultures of the demertic acid-producing organism grown at 28° C. in a crosshatch pattern on tomato patse oatmeal agar and examined at 7 and 14 days revealed the following microscopic morphology:
Vegetative mycelium: Branched, no evidence of fragmentation.
Aerial mycelium: Branched, ca. 0.7–2.1$\mu$ in diameter.
Sprophore: Spore chains arranged in open loops and spirals.
Conidia: Catenulate, ovoid 0.71–1.1$\mu$ by 1.4–2.1$\mu$, spore wall smooth but somewhat irregular.

*Streptomyces umbrosus* var. *suragaoensis* exhibits the following cultural characteristics when grown in a crosshatch pattern on the indicated nutrient media for 14 days at 28° C. The capitalized color names used in the description correspond to those in A Dictionary of Color, Maerz and Paul, Ed. 2, McGraw-Hill Book Co., Inc., New York, N.Y., 1950).

Medium No. 1 Tomato Paste Oatmeal Agar:
  Vegetative: Not visible.
  Aerial Mycelium: Abundant, Penguin (P1 38A–2).
  Reverse: Adobe (P1 14D–7).
  Soluble Pigment: None.

Remarks: Hooks, loops and loose spiral spore chains present.

Medium No. 2 Oatmeal Agar:
  Vegetative: Tan.
  Aerial Mycelium: Abundant, Chinchilla (P1 37A–3).
  Reverse: LIDO (P1 13C–3).
  Soluble Pigment: None.

Remarks: Loops and loose spiral spore chains present.

Medium No. 3 Glucose Yeast Extract Agar:
  Vegetative: Not visible.
  Aerial Mycelium: Moderate, Moonmist (P1 12A–2) to Chinchilla (P1 37A–3).
  Reverse: Oakbuff (P1 13D–7).
  Soluble Pigment: Pale greenish tan.

Remarks: Non-chromogenic; hooks, loops and irregular spiral spore chains present.

Medium No. 4 Nutrient Agar:
  Vegetative: Tan.
  Aerial Mycelium: Scant, buff.
  Reverse: Tanaura (P1 12D–4).
  Soluble Pigment: Light greenish tan.

Remarks: Non-chromogenic.

Medium No. 5 Bennett's Agar:
  Vegetative: Yellow.
  Aerial Mycelium: Scant, buff.
  Reverse: Sombrero (P1 11D–4).
  Soluble Pigment: Light tan.

Remarks: Non-chromogenic.

Medium No. 6 Glucose Asparagine Agar:
  Vegetative: Cream to yellow.
  Aerial Mycelium: Scant, Nickel (P1 36A–2).
  Reverse: Straw (P1 10F–2).
  Soluble Pigment: None.

Remarks: Flexuous; hooks, loops and loose spiral spore chains present.

Medium No. 7 Glycerol Asparagine Agar:
Vegetative: Yellow.
Aerial Mycelium: Abundant, Milk White (P1 9B-1) to Chinchilla (P1 37A-3).
Reverse: Straw (P1 10F-2).
Soluble Pigment: None.

Remarks: Flexuous; loops and irregular spiral spore chains present.

Medium No. 8 Czapek-Dox Agar:
Vegetative: Thin, colorless.
Aerial Mycelium: Scant, light gray.
Reverse: Moonmist (P1 12A-2).
Soluble Pigment: None.
Remarks: Loops and irregular spiral spore chains present.

Medium No. 9 Inorganic Salts Starch Agar:
Vegetative: Thin, tan.
Aerial Mycelium: Scant, white to Chinchilla (P1 37A-2).
Reverse: Putty (P1 11B-2).
Soluble Pigment: None.

Remarks: Regular spiral spore chains present; weak hydrolysis of starch.

Medium No. 10 Glycerol Calcium Malate Agar:
Vegetative: Golden Yellow.
Aerial Mycelium: Scant, Oyster White (P1 10B-1).
Reverse: Milk White (P1 9B-1).
Soluble Pigment: None.

Remarks: No clearing of the medium.

Tables I and II present results obtained in a series of miscellaneous physiological tests carried out at 28° C.

TABLE I

| Medium | Remarks |
| --- | --- |
| Peptone iron agar and yeast extract. | Medium blackened (melanin positive). |
| Tryptone yeast extract broth. | Medium dark brown at 2 days (melanin positive). |
| Starch agar | Weak hydrolysis of starch at 21 days. |
| Nutrient agar and 0.4% gelatin. | Positive hydrolysis of gelatin at 21 days. |
| Casein agar | No clearing of casein at 21 days. |
| Blood agar | No hemolysis of blood at 2 and 4 days. |
| Organic nitrate broth | No reduction of nitrate to nitrite at 21 days. |
| Potato plug | Growth moderate as wrinkled, olive tan to dark brown vegetative, scant white aerial mycelium, plug discolored grayish brown to dark brown. |

TABLE II

Carbon utilization pattern [1]

```
Xylose ------------------------------------ +
Arabinose --------------------------------- +
Rhamnose ---------------------------------- —
Fructose ---------------------------------- +
Glucose ----------------------------------- +
Sucrose ----------------------------------- —
Raffinose --------------------------------- —
Inositol ---------------------------------- +
Mannitol ---------------------------------- +
Control ----------------------------------- —
```

+ good growth, positive; — no growth, no utilization.
[1] Pridham, T. G. and Gottlieb, D., "Assimilation of Carbon Compounds in Synthetic Medium," J. Bacteriology, 56, pp. 107-114 (1948).

A careful comparison of the demetric acid-producing organism with other members of the genus Streptomyces suggests a close taxonomic relationship to *Streptomyces umbrosus* NRRL 2791 as indicated in Table III. Therefore, the present organism has been classified as a variety of *Streptomyces umbrosus*.

TABLE III

| | S. umbrosus var. suragaoensis ATCC 19104 | S. umbrosus NRRL 2791 |
| --- | --- | --- |
| Sporophore morphology. | Spiral | Spiral. |
| Color of aerial mycelium. | Gray | Gray. |
| Melanin production | + | +. |
| Spore surface and shape. | Smooth but somewhat irregular, ovoid. | Smooth but somewhat irregular, ovoid. |
| Antibiotic produced | Demetric acid plus a complex of agents related to the phyllomycins and the antimycins. | Phyllomycin. |

*Streptomyces umbrosus* var. *suragaoensis*, when grown under suitable conditions, produces demetric acid. A fermentation broth containing demetric acid is prepared by inoculating spores or mycelia of the demetric acid-producing organism into a suitable medium and then cultivating under aerobic conditions. For the production of demetric acid, cultivation on a solid medium is possible, but for production in large quantity, cultivation in a liquid medium is preferable. The temperature of the cultivation may be varied over a wide range, 20–35° C., within which the organism may grow, but a temperature of 25–30° C. and a neutral pH, i.e., 6.0–8.0, are preferred. In the submerged aerobic fermentation of the organism for the production of demetric acid, the medium contains as the source of carbon, a commercially available glyceride oil or a carbohydrate such as glycerol, glucose, maltose, sucrose, lactose, dextrin, starch, etc., in pure or crude states and as the source of nitrogen, an organic material such as soybean meal, distillers' solubles, peanut meal, cottonseed meal, meat extract, peptone, fish meal, yeast extract, corn-steep liquor, etc., and when desired, inorganic sources of nitrogen such as nitrates and ammonium salts, and mineral salts such as sodium chloride, potassium chloride, zinc sulfate and magnesium sulfate, and buffering agents such as calcium carbonate or phosphates and trace amounts of heavy metal salts; such medium ingredients include those listed in Canadian Patent 513,324 and in British Pats. 730,341 and 736,325 and in United States Pats. 2,691,618, 2,658,018, 2,653,899, 2,586,762, 2,516,080, 2,483,892, 2,609,329 and 2,709,672. In aerated submerged culture, an antifoam such as liquid paraffin, fatty oils or silicone is used. More than one kind of carbon source, nitrogen source or antifoam may be used for the production of demetric acid. Generally, the cultivation is continued until at least several hundred mcg./ml. of demetric acid is accumulated in the medium. The active substance is contained mainly in the mycelia.

The mycelia are separated from the fermentation liquor, and then the mycelia are extracted with water-soluble solvents such as acetone, methanol, ethanol, and other low alcohols, or by water-immiscible solvents such as ether, chloroform, and the like. The mycelial solvent-extracts are combined and concentrated, and extracted with butanol, concentrated, and then washed with water-insoluble solvents such as hydrocarbon solvent (boiling point, 63–75° C.). The crude demetric acid is purified by liquid-liquid extraction methods, e.g., Craig's countercurrent distribution technique, as more fully described in the example, and pure demetric acid is isolated as a crystalline solid.

Demetric acid is a light yellow crystalline substance in the form of needles when recrystallized from methanol-water or ethyl acetate-ether, and decomposes over a wide range of temperature without melting. It is soluble in most solvents except hexane and water, in which it is substantially insoluble. A solution in an equivalent amount of aqueous sodium bicarbonate on freeze-drying yields a crystalline material, the mono-sodium salt of the unsaturated acid. On thin layer chromatography of the acid employing a support of silica gel and a solvent consisting of benzene and methanol (3:1 volume by volume) a major and two minor zones separate, as indicated by bright yellow fluorescence in ultraviolet light (3660 A.) or by charring with sulfuric acid. On rechromatographing the material from the major zone under identical conditions the same three spots are obtained. Paper chromatography in 10 solvent systems in the absence of light indicate little inhomogeneity.

The elemental analysis of demetric acid is as follows: C=79.94%; H=6.81%; O (average)=14.02%; O (by difference)=13.25%. The molecular weight (thermoelectric) is 270, and the neutral equivalent, 254, 288, 270. The analysis and molecular weight indicate that the molecular formula is $C_{18}H_{18}O_2$: C=81.17%; H=6.81%; O=12.02%; molecular weight, 266.3.

The ultraviolet spectrum (FIG. 2) of a solution in ethanol shows peaks at 227, 283, and 314 mμ with absorptivities of 98, 180, and 170, respectively.

The infrared spectrum (FIG. 1) indicates the presence of an aromatic structure and an acid with conjugated double bonds. The nuclear magnetic resonance spectrum shows a doublet at 1.8δ due to a single methyl group, and bands between 5.5 and 8.0δ due to aromatic and olefinic protons. Integration of the graph supports the presence of the two types of hydrogen atoms approximately in the ratio of 3 to 14 in addition to one acidic hydrogen.

Reduction of the acid was carried out in ethanolic solution at room temperature over 5% platinum on carbon at 40 p.s.i. of hydrogen with the rapid absorption of four moles of hydrogen. After filtration of the catalyst the solution was dried, and the residue was extracted with "Skellysolve B." This solution was chromatographed on a column of silicic acid with "Skellysolve B" containing increasing amounts of chloroform. The residue from the rich eluate gave a soft crystalline mass from "Skellysolve B" solutions. Thin layer chromatography showed one zone without fluoroescence in ultraviolet light. The infrared spectrum and the ultraviolet spectrum ($\lambda_{max}$=212 mμ) gave further proof of the absence of unreduced material. The nuclear magnetic resonance spectrum shows a sharp peak at 7.13δ and bands between 0.5 and 3.0δ. The hydrogen count supports the presence of aromatic to aliphatic protons in the ratio of four to 23, i.e. an uptake of 10 hydrogens during hydrogenation.

Mass spectroscopy of the unsaturated and the reduced acids gave molecular weights of 266 and 276, respectively.

*Analysis.*—Calc'd for $C_{18}H_{28}O_2$ (percent): C=78.21; H=10.21. Found (percent): C=76.60; H=10.10.

Derivatives of both the parent and the hydrogenated acid can be prepared. The reduced acid was heated with thionyl chloride and poured into cold ammonium hydroxide; the product, recrystallized four times from aqueous ethanol, melts at 79.5° C. (capillary, uncorrected).

*Analysis.*—Calc'd for $C_{18}H_{29}ON$ (percent): C=78.49; H=10.61; N=5.09. Found (percent): C=78.49; H=10.44; N=5.02 (average).

The unreduced acid, on treatment with permanganate-periodate (Von Rudloff, 1964, "Permanganate-Periodate Oxidation" Can. J. Chem., 43, 1784–1791), consumed rapidly 10 moles of periodate and 23.2 moles after 120 hours. The acidic reaction product was isolated and crystallized from tertiary butanol. Paper chromatography (Braun and Geenen, 1962, "Dunnschicht Chromatographie von Carbonsauren," J. Chromatographie, 7, 56) indicates this material to be phthalic acid; its infrared spectrum is identical with that of an authentic sample. Based on the information obtained, the following partial structure for demetric acid is proposed.

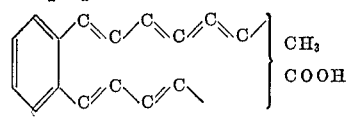

Demetric acid was found to have the following antimicrobial spectrum.

TABLE IV

Antimicrobial spectrum of demetric acid

| Test Organism | Minimal inhibitory Concentration μg./ml. |
|---|---|
| Anaerobic bacteria: | |
| Peptococcus prevotti ATCC 9321 | 50 |
| Clostridium feseri ATCC 10092 | 25 |
| Aerobic and facultative bacteria: | |
| Aerobacter aerogenes A9532 | >100 |
| Alcaligenes faecalis A9542 | 100 |
| Brucella bronchiseptica A9901 | >50 |
| Corynebacterium xerosis A9529 | 12.5 |
| Escherichia coli A9499–1 | >100 |
| Gaffkya tetragena A9580 | 25 |
| Klebsiella pneumoniae A9501 | 100 |
| Proteus mirabilis A9644 | >100 |
| Pseudomonas aeruginosa A9502 | 100 |
| Salmonella typhosa A9498 | >100 |
| Sarcina lutea A9547 | 100 |
| Streptococcus faecalis A9536 | 100 |
| Neisseria catarrhalis A9677 | 1.6 |
| Serratia marcescens A9549 | >100 |
| Streptococcus pyogenes A9604 | 50 |
| Mycobacterium shegnatis A9584 | 25 |
| Diplococcus pneumoniae A9585 (+5% human serum) | 100 |
| Staphylococcus aureus A9537 (+50% human serum) | 100 |
| Yeasts: | |
| Kloeckera brevis ATCC 9774 | 6.3 |
| Saccharomyces cereviseae | 100 |
| Candida albicans | 100 |
| Candida utilis | 6.3 |
| Protozoa: | |
| Tetrahymena pyriformis | 12.5 |
| Ochromonas malhamensis | 25 |
| Crithidia fasiculata | 25 |
| Fungi: | |
| Penicillium chrysogenum A9845 | 25 |
| Thamnidium elegans A9946 | 6.3 |
| Paecilomyces variota A9940 | 100 |
| Aspergillus sydowi A9937 | 50 |
| Aspergillus fumigatus A9752 | 25 |
| Monascus ruber A9412 | 6.3 |

Studies of HeLa tissue cells, human epidermoid carcinoma of cervix showed demetric acid and its sodium salt to be inhibitory at about 1 μg./ml. in liquid dilution tests. Solutions in water or aqueous ethanol were active after storage at 4° C. for two months, but lost activity at higher temperatures, and rapidly in phosphate buffer of pH 8. In agar plate diffusion tests, zones of inhibition of 23 mm. formed at a concentration of 125 μg./ml. The $LD_{50}$ in mice (i.p.) is 265 mg./kg. for demetric acid.

The following example is intended to illustrate the invention described herein without unduly restricting it.

EXAMPLE

Production.—A vegetative culture of *Streptomyces umbrosus* var. *suragaoensis*, A.T.C.C. No. 19104, is grown in a medium of the following composition (weight by volume): 2% cerelose, 1% cottonseed endosperm flour (Pharmamedia, Trader Oil Mill Co., Fort Worth, Tex.), 1% corn-steep liquor, 0.3% $(NH_4)_2SO_4$, 0.003% $ZnSO_4 \cdot 7H_2O$, and 0.4% $CaCO_3$. After 35 hours of incubation at 28° C., 5 gallons of culture is transferred to a tank containing 600 gallons of a medium consisting of 2% glycerol, 1% Pharmamedia, 1% corn-steep liquor, 0.3% $(NH_4)_2SO_4$, 0.003% $ZnSO_4 \cdot 7H_2O$, and 0.4% $CaCO_3$. Air flow is maintained at a rate of 50 cubic feet per minute, the agitation at 155 revolutions per minute, the temperature at 28° C., and the culture fermented for 180 hours.

Isolation.—The mycelium from 2270 liters of fermentation liquor was filtered with the aid of diatomaceous earth and slurried in 1000 liters of methanol. The wet methanol slurry was filtered and concentrated to an aqueous residue (50 liters); this was extracted with n-butanol (50 liters) at pH 4.5–6.0. The butanol extract was concentrated to an oil which was freed of substances soluble in "Skellysolve B" (hydrocarbon solvent, boiling point 63–75° C.) and insoluble in methanol.

The crude concentrate was dissolved in a mixture of methanol, benzene, "Skellysolve B," and water (4:3:2:1) and distributed through 100 cycles in a Craig-Post machine. The active material, assayed by ultraviolet absorption and HeLa cell plate assays, was found between tubes 55–80. The active fractions from three runs were combined, dried, and recycled over 200 tubes under the same conditions. The distribution curve was approximately that for a pure compound, and 8 gm. of crystalline demetric acid were isolated from tubes 150 to 170.

While this invention has been described and exemplified in terms of its preferred embodiment, those skilled in the art will appreciate that modifications can be made without departing from the spirit and scope of this invention.

What is claimed is:

1. A composition of matter designated as demetric acid, said composition being characterized by substantial insolubility in hexane and water, and exhibiting in the pure state light yellow crystalline needles, a molecular weight of 270 by thermo-electric determination, an elemental analysis as follows: 79.94% carbon, 6.81% hydrogen, 13.25% oxygen (by difference), a molecular formula as follows: $C_{18}H_{18}O_2$, an ultraviolet absorption spectrum in ethanol exhibiting maxima at 227, 283 and 314 m$\mu$ with absorptivities of 98, 180 and 170, respectively, and an infrared absorption spectrum in potassium bromide as shown in FIG. 1 of the drawings.

2. A pharmaceutically acceptable nontoxic salt of the composition of claim 1.

3. The sodium salt of the composition of claim 1.

4. The process of producing demetric acid as defined in claim 1, which comprises cultivating *Streptomyces umbrosus* var. *suragaoensis* under submerged aerobic conditions in an aqueous carbohydrate solution containing a nitrogenous nutrient until substantial activity versus HeLa cells is produced in said medium.

5. The process of producing demetric acid as defined in claim 1, which comprises cultivating *Streptomyces umbrosus* var. *suragaoensis* under submerged aerobic conditions in an aqueous carbohydrate solution containing a nitrogenous nutrient until substantial activity versus HeLa cells is produced in said medium, and then recovering from the broth the demetric acid thus produced.

6. The process of producing demetric acid as defined in claim 1, which comprises cultivating *Streptomyces umbrosus* var. *suragaoensis* under submerged aerobic conditions in an aqueous carbohydrate solution containing a nitrogenous nutrient at a temperature of substantially from 25–30° C. and for about one to six days.

No references cited.

JEROME D. GOLDBERG, Primary Examiner

U.S. Cl. X.R.

195—80